United States Patent [19]

Devillier

[11] Patent Number: 5,850,435
[45] Date of Patent: Dec. 15, 1998

[54] METHOD FOR AUDIBLE CALLER NAME ANNOUNCEMENT WITH CALL LIST FEATURE

[75] Inventor: Douglas André Devillier, Thornton, Colo.

[73] Assignees: U S West, Inc., Denver; MediaOne Group, Inc., Englewood, both of Colo.

[21] Appl. No.: 609,574

[22] Filed: Mar. 1, 1996

[51] Int. Cl.$^6$ ................................................. H04M 15/06
[52] U.S. Cl. ........................... 379/374; 379/88; 379/142; 379/207
[58] Field of Search ..................... 379/142, 127, 379/67, 217, 88, 196, 199, 201, 207, 372, 373, 374, 375, 245

[56] References Cited

U.S. PATENT DOCUMENTS

| | | | |
|---|---|---|---|
| 4,377,729 | 3/1983 | Stacy | 379/110.01 X |
| 4,922,490 | 5/1990 | Blakley | 379/88 X |
| 4,930,152 | 5/1990 | Miller | 379/214 |
| 4,935,956 | 6/1990 | Hellwarth et al. | 379/112 |
| 5,121,423 | 6/1992 | Morihiro et al. | 379/142 |
| 5,155,761 | 10/1992 | Hammond | 379/67 |
| 5,185,787 | 2/1993 | Katz | 379/204 |
| 5,265,145 | 11/1993 | Lim | 379/88 |
| 5,303,301 | 4/1994 | Takahata | 379/142 |
| 5,375,161 | 12/1994 | Fuller et al. | 379/57 |
| 5,452,346 | 9/1995 | Miyamoto | 379/142 |
| 5,471,519 | 11/1995 | Howe et al. | 379/67 |
| 5,511,111 | 4/1996 | Serbetcioglu | 379/67 |
| 5,526,406 | 6/1996 | Luneau | 379/61 |
| 5,533,102 | 7/1996 | Robinson et al. | 379/67 |
| 5,651,053 | 7/1997 | Mitchell | 379/67 |
| 5,692,038 | 11/1997 | Kraus et al. | 379/210 |

OTHER PUBLICATIONS

An Application of In Technology for 800 MHz PCS, GTE Telecommunication Services Inc., Anjan Ghosal, IEEE Apr. 1994, pp. 624–628.

Library of Congress Cataloging–In–Publication Data, Chapter One, Signaling System, Copyright 1995, Travis Russell, pp. 18–27.

(List continued on next page.)

*Primary Examiner*—Scott L. Weaver
*Attorney, Agent, or Firm*—Judson D. Cary; Brooks & Kushman

[57] ABSTRACT

A method to audibly announce an identified caller name includes one embodiment, the caller name includes determined by making a query to a database with phone numbers and corresponding line owners (e.g., to the line information database (LIDB)). In this embodiment, the system phonetically pronounces the name found in the database to the subscriber in an announcement. In another embodiment, the system requests that the calling party speak their name. The spoken name is recorded, and played back to the subscriber in an announcement. The caller is placed on hold while the caller name is provided to the subscriber in an announcement. The subscriber may either accept the call, or reject the call. If the call is accepted, the call is connected. If the call is rejected, the line is busy, or there is no answer, the caller is notified. In one embodiment, a rejected call is transferred to a voice mail system. In yet another embodiment, the subscriber can selectively activate or deactivate the audible caller name feature (e.g., in order to take calls personally without screening, or to use an answering machine). In yet another embodiment, incoming call names are placed on a call list. The subscriber can later access the call name list, and make calls to telephone numbers corresponding to names on the list.

5 Claims, 5 Drawing Sheets

OTHER PUBLICATIONS

Advanced Intelligent Network (AIN) Service Control Point (SCP) Generic Requirements, Bellcore, Issue 1, Aug. 1993, pp. Preface 1 — Appendix 88.

Advanced Intelligent Network (AIN) 0.1 Switching Systems Generic Requirements, Bellcore, Issue 1, Aug. 1992, pp. i — Appendix C-20.

Advanced Intelligent Network (AIN) 0.1 Switch–Service Control Point (SCP) Application Protocol Interface Generic Requirements, Bellcore, Issue 1, Aug. 1992, Technical Reference TR–NWT–001285, pp. i — B–16.

Letter to Federal Communications Commission re: AIN dated Sep. 28, 1995 from Bruce K. Cox, AT&T (1 page letter and 15 pages attachments).

Info Access Co., Texas Instruments introduces Spoken Caller ID, Business Wire, p03200038, Mar. 20, 1995.

Reuters Info. Svcs., Texas Instruments Says Caller ID Up for Trials, Reuter, Reuter Economic News, Mar. 20, 1995.

Video Takes Back Seat At Telco Meet, Multichannel News, Mar. 27, 1995, ISSN: 0276–8593, Fred Dawson.

Wireless Providers Meet Sophisticated Needs, Telephony, Jun. 6, 1994, Charles F. Mason, East Coast Bureau Chief, p. 58–63.

Texas Instruments Device Gives Voice to Phone Caller ID Services, Information Access Co., Computergram International, Mar. 21, 1995, ISSN: 0268–716X.

Texas Instruments Entry Clobbers Stock of Caller ID Firms, Reuter, Reuter Economic News, Mar. 20, 1995.

Newsbytes Daily Summary, Mar. 21, 1995, pNEW03210030.

ProQuest, Macworld, vol: 12, Iss: 6, Date: Jun. 1995.

TI Intros Spoken Caller ID, Newsbytes, Mar. 21, 1995, pNEW03210018.

Delays in Nationwide Caller ID Availability Could Cost RBOCs Big, Telco Business Report, Apr. 10, 1995, V. 12, No. 8, ISSN: 8755–3511.

Telecommuting Review: the Gordon Report, Nov. 1994, v11, n11, p. 4(5), Gil Gordon Associates 1994.

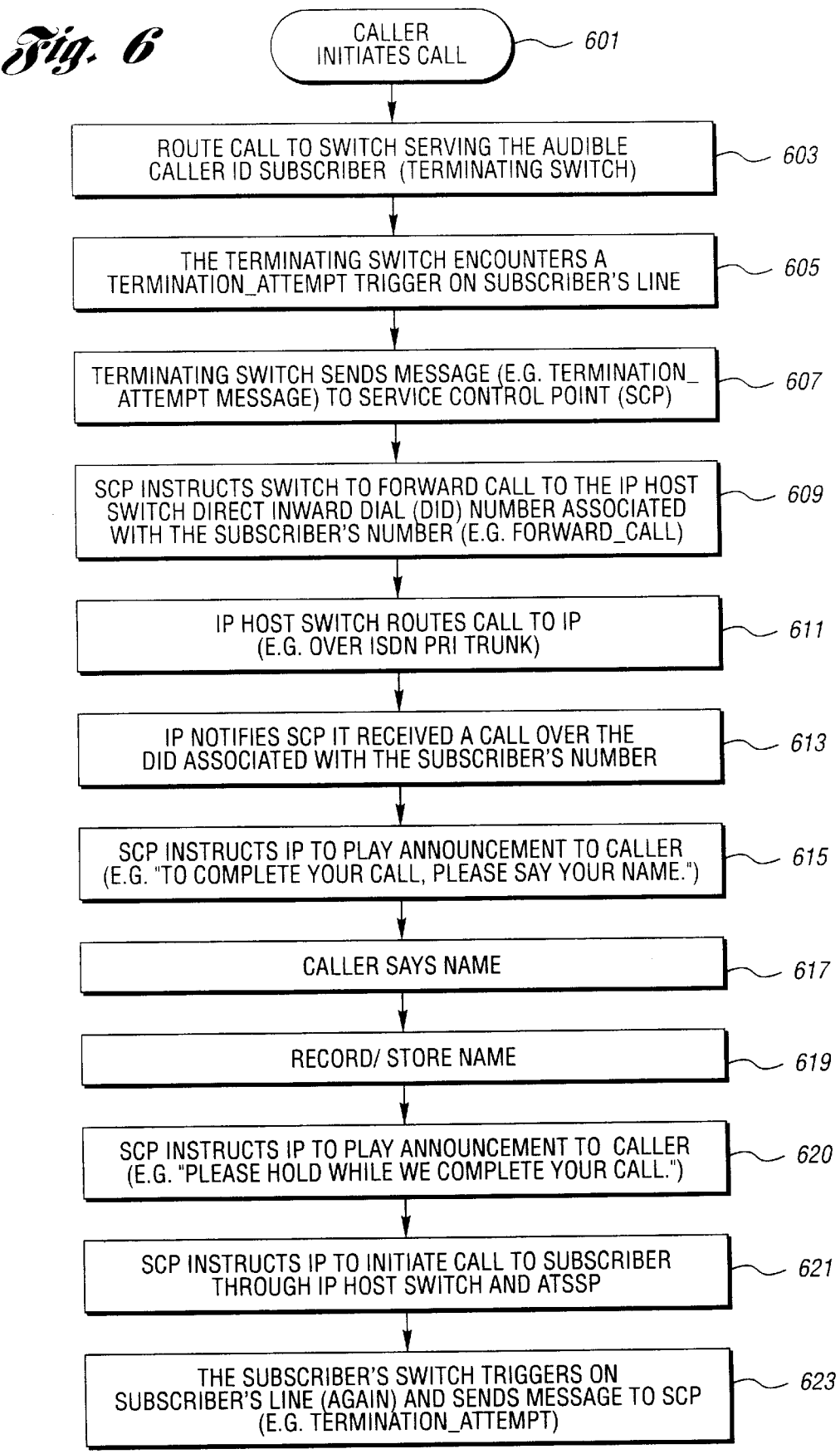

METHOD FOR AUDIBLE CALLER NAME ANNOUNCEMENT WITH CALL LIST FEATURE

BACKGROUND OF THE INVENTION

1. Field of the Invention

This invention relates generally to a caller-ID system and method, and more specifically to a caller-ID system and method that audibly provides the calling party name.

2. Description of the Related Art

Conventional caller identification (caller-ID) systems provide the receiving party of an incoming telephone call with the calling party telephone number. Conventional systems require a special caller-ID customer premises equipment (CPE) display device that attaches to a standard telephone handset to display the calling party number (e.g., a two line digital liquid crystal display (LCD) screen). Thus, without the proper display device, conventional telephone handsets cannot make use of caller-ID. In addition, the receiving party must be within sight of the display device to view the number. This limitation is not conducive to mobile telephone users (e.g., wireless, cellular, cordless) who do not have a display device or any user who is not within sight of the display. The display limitation also makes conventional caller-ID systems nonfunctional for visually impaired persons. Conventional caller-ID systems also require the subscriber to wait for at least two rings before the calling number is displayed. Furthermore, many telemarketing companies use caller-ID to store telephone numbers in databases that are later sold to other telemarketing companies. Thus, for privacy issues, many callers would prefer not to reveal their phone number so that they are not added to automatic calling databases.

Other conventional caller-ID systems deliver the calling party name to an LCD screen. These systems also require a special display device attached to the telephone handset to display the name. In this conventional system, the SCP does not initiate or launch the requested name information. Other conventional caller-ID systems provide a spoken caller number in digit form. As most customers do not remember the number of each potential calling party, this system provides little, or less useful, information to the receiving party.

Thus, there is a need for a system and method for providing to a receiving party the name of the calling party in audible form. There is also a need to allow for a flexible and personalized implementation of audible caller name identification, wherein the caller is able to identify himself or herself in their own voice. There is also a need to allow the subscriber to selectively turn on or off the audible caller name feature (e.g., especially when a subscriber has an answering machine in use, or wishes to answer calls personally without screening).

SUMMARY OF THE INVENTION

The present invention is a directed to an audible caller name identification system and method. In one embodiment, the caller name or line owner is determined by making a query to a database with phone numbers and corresponding names (e.g., party line owners found in a line information database (LIDB)). In this embodiment, the system phonetically pronounces the name found in the database to the subscriber. In another embodiment, the system requests that the caller speak their name or otherwise identify themselves. The spoken name is recorded, and played back to the subscriber in an announcement. In yet another embodiment, a query is made to a phone number/line owner database. If a line owner name is found in the database it is phonetically reproduced in an announcement to the subscriber. If a line owner name is not found in the database, the system requests that the caller identify themselves.

The caller is placed on hold while their name is announced to the subscriber. The subscriber may either accept the call, or reject the call. If the call is accepted, a call connection is made. If the call is rejected, busy, or there is no answer, the calling party is notified that their party cannot be reached. In one embodiment, a rejected call is transferred to a voice mail system. In yet another embodiment, the subscriber can selectively activate or deactivate the audible caller name feature (e.g., in order to take calls personally without screening, or to use an answering machine). In yet another embodiment, incoming calls are saved on a list by name and/or number. The subscriber can later access the list by name and connect telephone calls to the corresponding numbers.

BRIEF DESCRIPTION OF THE DRAWINGS

FIGS. 6–6A are call flow diagrams of the method of the present invention implemented in an advanced intelligent network (AIN).

DESCRIPTION OF THE PREFERRED EMBODIMENTS

Figure 1:
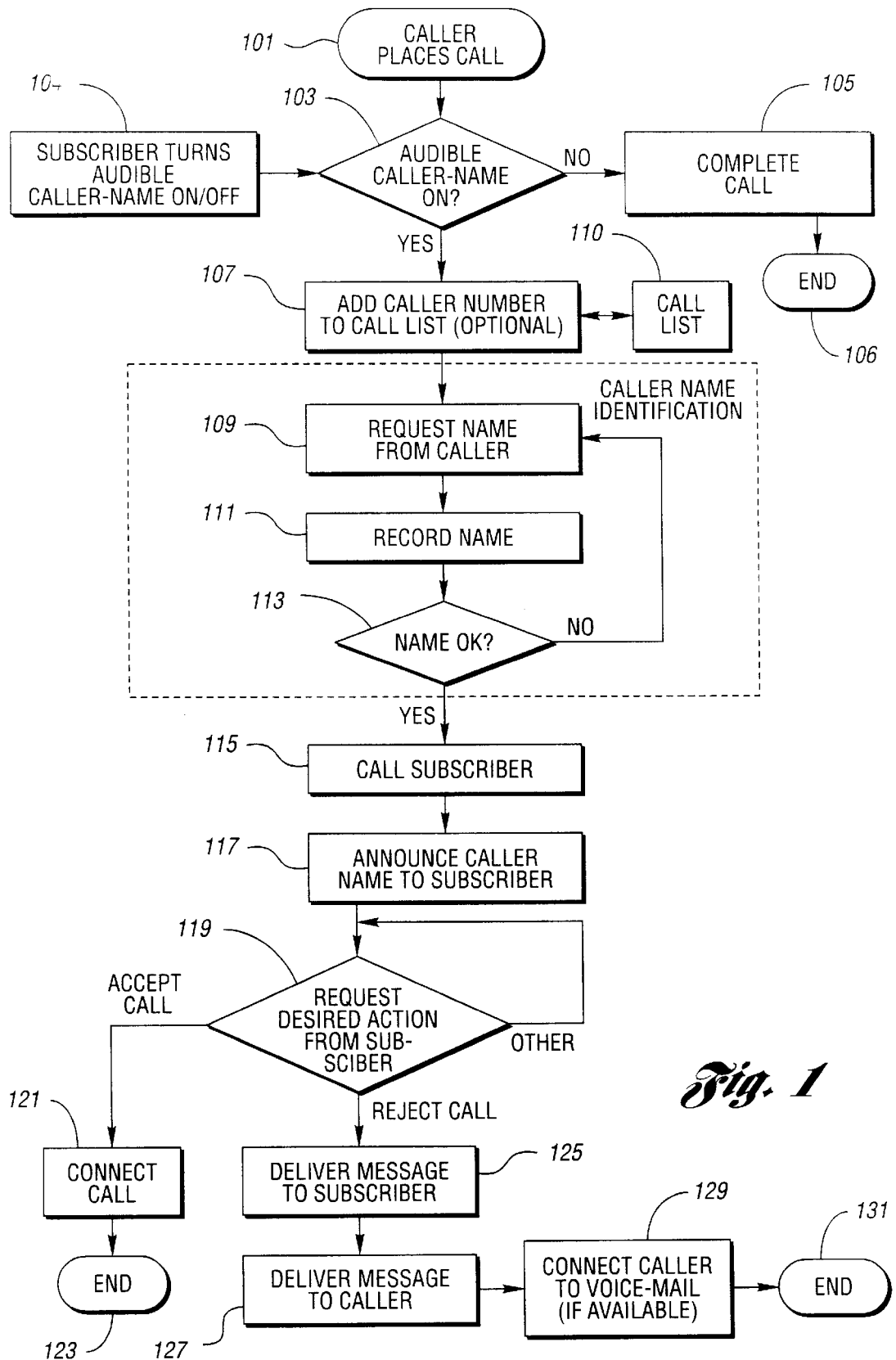
FIG. 1 is a call flow diagram of the method of the present invention.

FIG. 1 is a call flow diagram of one embodiment of the present invention. A call is initiated by a caller placing a call to a subscriber 101. Optionally, a check is made to determine if the audible caller name feature is turned on 103. In one embodiment, the audible caller name identification feature can be turned on or off by the subscriber to the service by, for example, dialing an audible caller name service update telephone number 104. This embodiment has the advantage of flexibly allowing the subscriber to selectively control the audible caller name feature (e.g., turn on at night, turn off during business hours, or turn off if an answering machine is on, or optionally take calls personally without screening). If the audible caller name feature is not on, the call is completed conventionally 105 and the process ends 106. If the audible caller name feature is on, the caller name and/or number is optionally added 107 to a call list 110 (e.g., a database of recent callers). In one embodiment, the subscriber can access the call list to determine the most recent callers, referenced by either name or number. The subscriber can place a call to corresponding telephone numbers of names on the list, and/or modify the contents of the list. The list 110 can be accessed, for example by calling an audible caller name service update telephone number.

A request is made to the caller to say their name or otherwise provide identification 109. For example, the system plays a stored message "To complete your call, please say your name at the tone and then press pound," (or optionally, a period of silence marks the end of the name), or the like. Announcements are stored, for example, on a conventional intelligent peripheral (IP) device attached to a switch. The name received is recorded 111. A check is made to determine if a valid name or identification was received and/or recorded 113. Silence, inaudible speech, noise, system errors, or other failures, for example, may indicate that a valid name was not received and/or recorded. If a valid name was not received and/or recorded, the request for the caller to say their name is made again 109. This process may repeat until a proper name/identification is given, or the system error limit is reached (e.g., three attempts).

If a valid name was received, the caller is placed on hold, and a call is made to the subscriber 115. The call to the subscriber may be initiated by a conventional switch (e.g., 5ESS or 1AESS switches made by AT&T) or alternatively, a conventional intelligent peripheral (IP) device attached to the switch. An IP is conventionally used to initiate and bridge calls, and to create, record, change and play announcements.

When the subscriber answers the call, an audible announcement is made to the subscriber 117 using the recorded name/identification 111. For example, "You have a call from <recorded name> at 555-1212" or the like. In one embodiment, the audible announcement is made on a conventional phone comprising or coupled to an ear speaker or speakerphone. Alternatively, the audible announcement is made on a peripheral speaker device coupled to the phone, for example, a stereo speaker, a computer speaker, or a TV speaker. This alternative embodiment (and the speakerphone embodiment) has the advantage of not requiring the subscriber to physically pick up the phone, or even be near the phone, to determine who is calling. In this embodiment, an audible caller name announcement can replace a conventional ring of a phone.

A request for the desired response is made to the subscriber 119. For example, "To accept it press or say 1. To reject it press or say 2." If the call is accepted, the call is connected 121, and the process ends 123. If the call is rejected by the subscriber, a message is delivered to the subscriber, for example, "The caller will be advised that you could not be reached. Good-bye." 125. If the call is rejected by the subscriber, the call is not answered by the subscriber, or the subscriber phone is busy, a message is delivered to the caller, for example, "Sorry, your party could not be reached. Please try again later. Good-bye." 127. In one option, the caller is optionally sent to the subscriber's voice mail, if available 129. And, the process ends 131.

Figure 2:
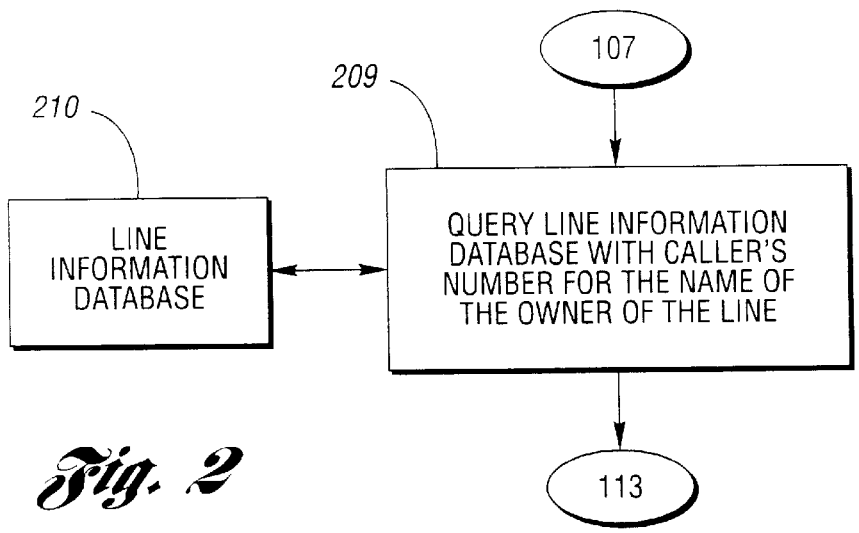
FIG. 2 is a call flow diagram of an alternative embodiment for obtaining caller identification.

FIG. 2 is a call-flow diagram of an alternative embodiment of the caller name identification invention. In this embodiment, line information associated with the calling party number (e.g., comprising the name of the owner of the line) is accessed automatically 209 from a line information database 210. For example, the calling party number is used to query the Line Information Database (LIDB) to retrieve the name of the owner of the caller line. LIDB is a conventional database used in the local telephone network. Thus, no interaction with the caller is required. The callflow then proceeds as described above in FIG. 1. Optionally, a check for a valid line owner name (e.g., not null or otherwise invalid) is made 113. In this embodiment, the caller name is announced to the subscriber 117 using conventional phonetic pronunciation techniques applied to the textual name of the owner of the line.

Figure 3:
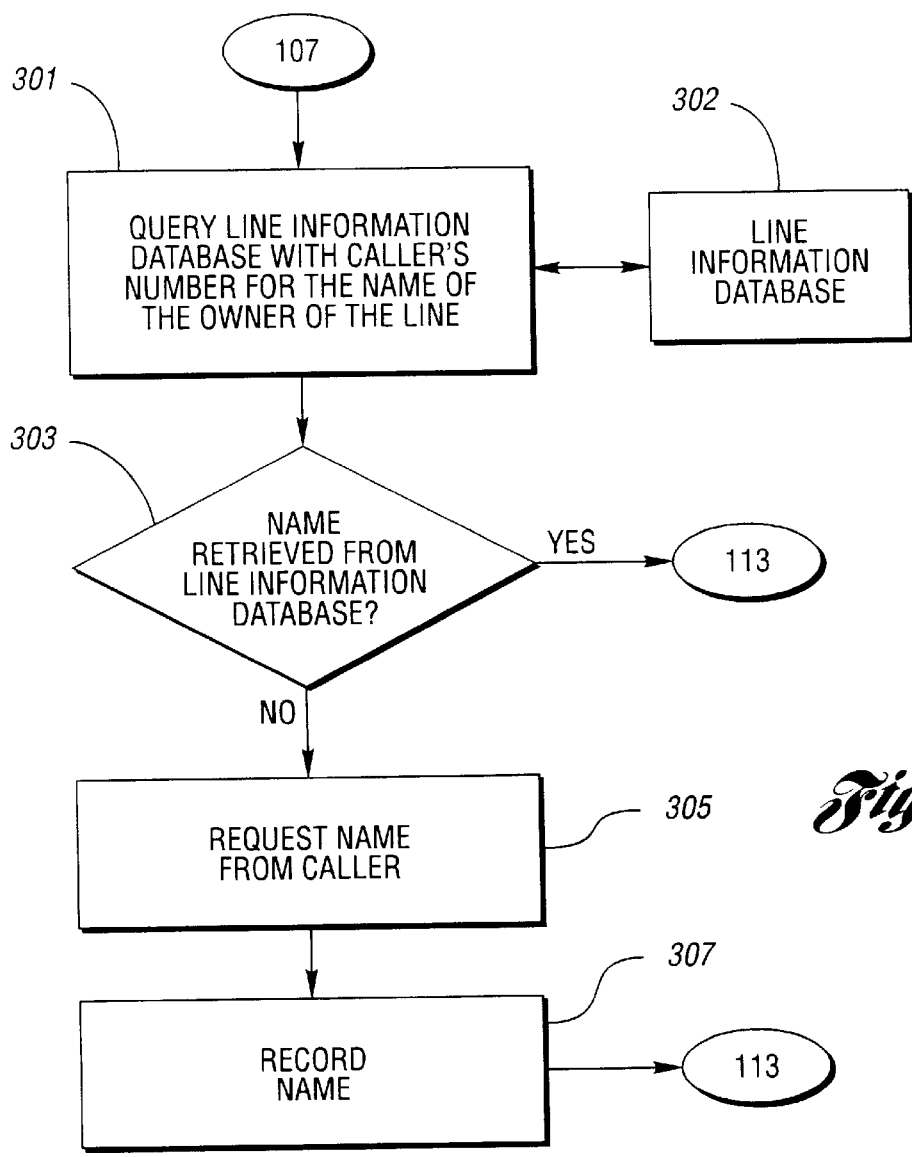
FIG. 3 is a call flow diagram of an alternative embodiment for obtaining caller identification.

FIG. 3 is a call-flow diagram of an alternative embodiment of the caller name identification invention. In this embodiment, an attempt to automatically retrieve the name of the owner of the line from a database is made 301. If a line owner is found 303, the call proceeds as described above in FIG. 2 (e.g., a pronunciation of the line owner name is provided to the subscriber 117). If the retrieval of the line owner name is not successful (e.g., null or otherwise invalid) 303, a name is requested from the caller 305 and recorded 307. The call then proceeds as in FIG. 1 (e.g., the recorded name is played to the subscriber 117). In this embodiment, the caller name identification invention proceeds without interaction from the caller if possible, and requests identification of the caller when unable to retrieve a name from alternative sources.

Figure 4:
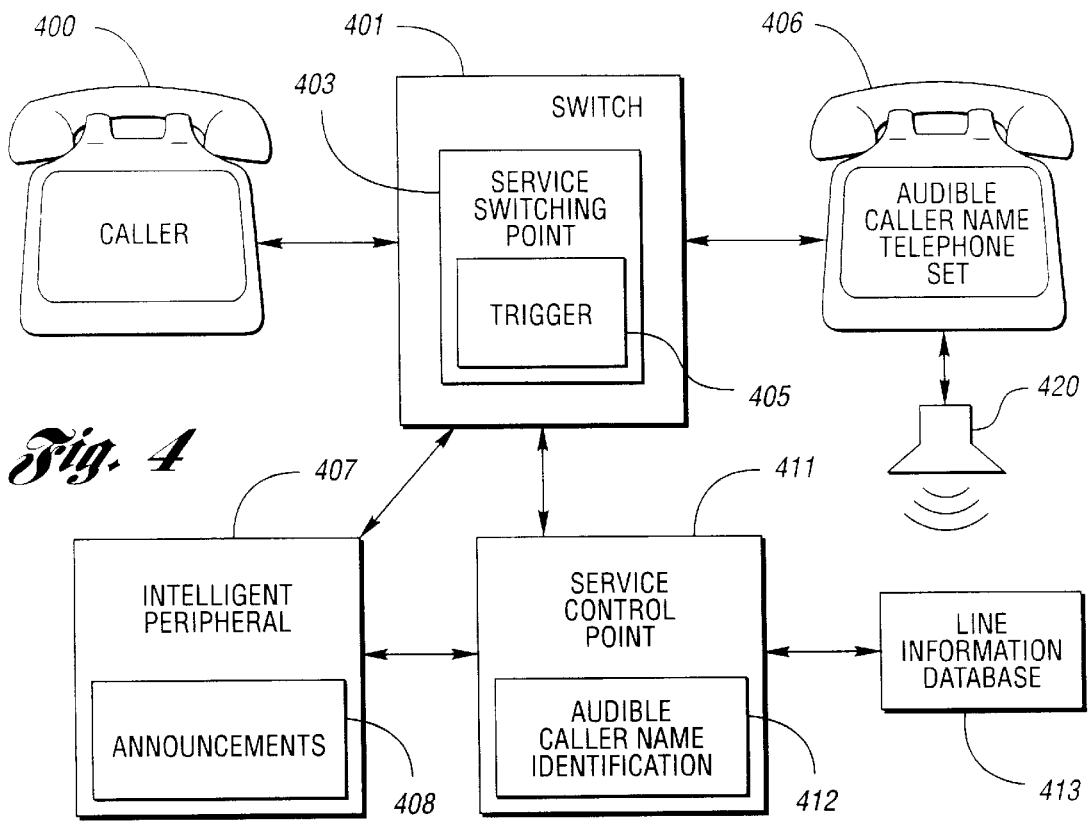
FIG. 4 is a block diagram of the physical and functional components of the present invention.

FIG. 4 is a block diagram of the hardware and software components of the communication means of the present invention. Telephone set 400 is conventionally coupled to switch 401. Switch 401 is a conventional end office switch, for example, a 5ESS or 1AESS switch by AT&T or a DMS 100 switch by Northern Telecom.

Switch 401 comprises a service switching point (SSP) 403 that provides AIN call processing capabilities. AIN is generally described in, for example, Advanced Intelligent Network (AIN) 0.1 Switching Systems Generic Requirements, TR-NWT-001284, Issue 1 Bell Communications Research, August 1992. Alternatively, SSP 403 functionality can be provided in an access tandem in switch 401. SSP 403 comprises trigger 405 that triggers upon dialing of the subscriber's number. Trigger 405 is, for example, a conventional Termination Attempt trigger (TAT), or a 3/6/10 trigger. SSP 403 is conventionally coupled to audible caller name telephone set 406. Audible caller name telephone set 406 comprises or is coupled to a conventional phone ear speaker or speakerphone 420. Alternatively, the speaker 420 is, for example, a stereo speaker, a computer speaker, or a TV speaker. SSP 403 is also conventionally coupled to intelligent peripheral (IP) 407. IP 407 can also be coupled to SSP 403 via another IP host switch. IP 407 is conventionally used to initiate and bridge calls, and to create, record, change and play announcements 408. Alternatively, switch 401 provides call initiation, bridging, and announcement services. A signal transfer point (STP) serves to conventionally couple switch 401 and service control point (SCP) 411.

A conventional SCP is described in, for example, Advanced Intelligent Network (AIN) Service Control Point (SCP) Generic Requirements TA-NWT-001280 Issue 1, Bell Communications Research August 1992; and Advanced Intelligent Network (AIN) 0.1 Switch - Service Control Point (SCP) Application Protocol Interface Generic Requirements, TR-NWT001285, Issue 1, Bell Communications Research, August 1992. The SCP 411 of the present invention comprises module or software program code or instructions for implementing the audible caller name identification 412 invention as described above. SCP 411 also comprises subscriber-specific data associated with the audible caller name invention (e.g., service on/off capability, caller list dialing and maintenance). In one embodiment, SCP 411 is conventionally coupled to line information database (LIDB) 413 for automatic access to the line owner name. Conventional network software, for example AIN release 0.0 or 0.1 software controls IP 407, SCP 411, and switch 401.

Figure 5:
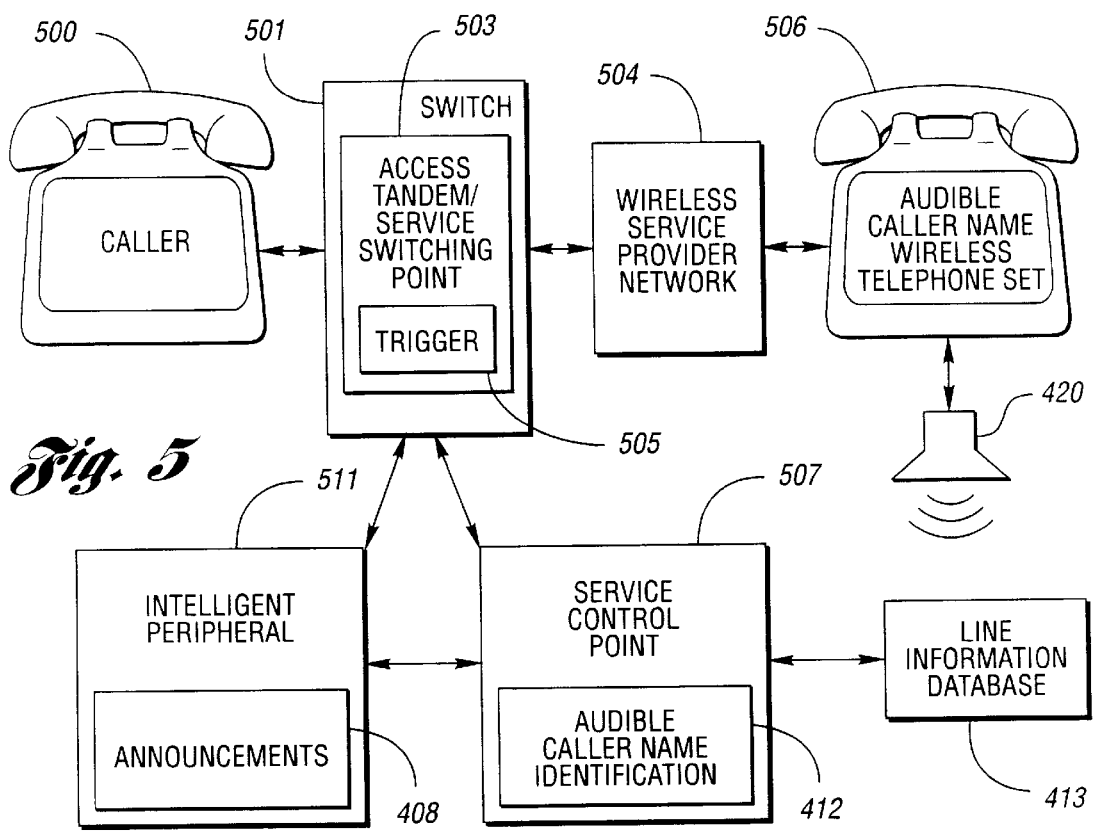
FIG. 5 is a block diagram of the physical and functional components of an alternative embodiment the present invention for an advanced intelligent network (AIN).

FIG. 5 is block diagram of the hardware and software components of an alternative embodiment of the communications means of the present invention, wherein the subscriber accesses audible caller name AIN services in the local service provider's network via a wireless network. Caller line 500 is conventionally coupled to switch 501.

Switch 501 comprises access tandem service switching point (ATSSP) 503. In one embodiment ATSSP provides 0.1 AIN functionality and comprises a 10-digit AIN trigger 505 that triggers on the subscriber's number. Trigger 505 is, for example, a conventional 3/6/10 trigger. ATSSP 503 is conventionally coupled to wireless service provider (WSP) network 504. Audible caller name wireless telephone set 506 is conventionally coupled to WSP 504 (e.g., via wireless cellular connection).

Figure 6A:
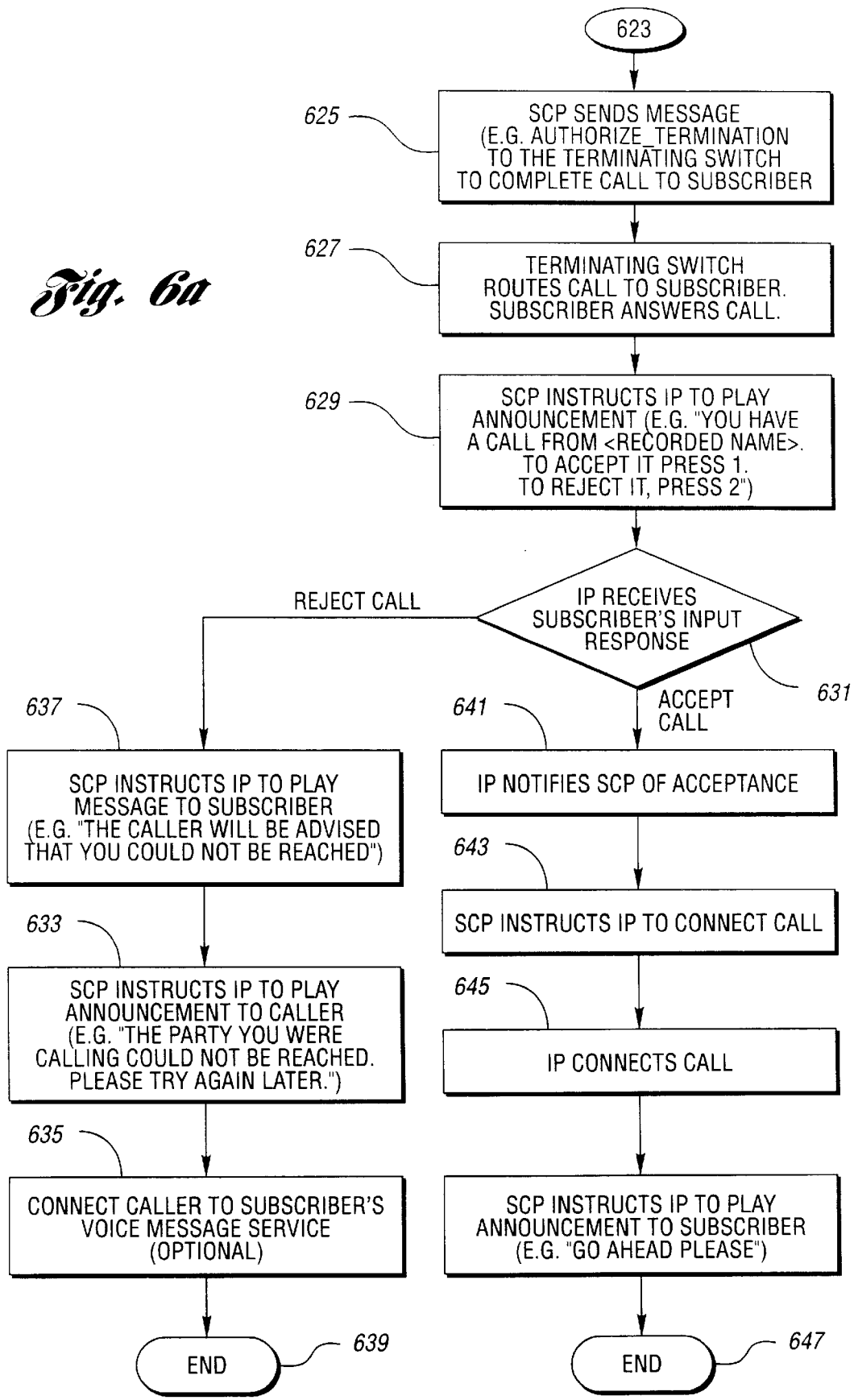

ATSSP 503 is also conventionally coupled to service control point (SCP) 507 and intelligent peripheral (IP) 511. IP 511 can also coupled to ATSSP 503 via another IP host switch. SCP 507 is conventionally coupled to IP 511. SCP 507 comprises module or software program code or instructions for implementing the audible caller name identification 412 invention as described above FIGS. 6 and 6a are a call-flow diagram of an embodiment of the caller name identification invention. FIGS. 6 and 6a illustrate a residential application of the present invention, for example, as shown in FIG. 4. Application to a wireless environment, e.g., as shown in FIG. 5, can be similarly implemented, for example, by using an access tandem service switching point as shown in FIG. 5. A call is initiated by a caller placing a call to a subscriber 601. The call is routed to the switch serving the audible caller name subscriber (i.e., the terminating switch) 603. The terminating switch encounters a trigger on the subscriber's line 605. The terminating switch provides 0.1 AIN-like functionality and comprises, for example, a termination attempt trigger, or a 3/6/10 10-digit trigger. The terminating switch sends a message (e.g., a Termination_Attempt message) to the service control point (SCP) 607. The SCP responds with a message to the terminating switch to forward the call to the intelligent peripheral (IP) host switch direct inward dial (DID) number associated with the subscriber's number (e.g., an AIN "Forward_Call" message) 609. In some cases, the intelligent peripheral host switch may be a different switch than the terminating switch. The DID number associated with the subscriber's number is stored in the terminating switch with the subscriber data.

The IP host switch routes the call to the IP (e.g., over an ISDN primary rate interface (PRI) trunk) 611. The IP notifies the SCP that it received a call over the DID associated with the subscriber 613. The SCP instructs the IP to play an announcement to the caller 615. The IP plays the announcement to the caller over the ISDN PRI trunk connected to the caller (e.g., "To complete your call, please say your name, and then press #."). The caller says his or her name or otherwise provides identification 617 and it is recorded 619 by the IP. The SCP instructs the IP to play an announcement to the caller (620) (e.g., "Please hold while your call is being completed.").

The SCP instructs the IP to initiate a call to the subscriber 621. The IP originates a call to the subscriber routed through the switch hosting the IP and to the subscriber's terminating switch. The terminating switch, recognizing that another call is bound for the subscriber, triggers on the subscriber's line (for the second time) and sends a message (e.g., Termination_Attempt), to the SCP 623. Continuing with FIG. 6a, the SCP, recognizing that this new call was originated from the IP by looking at the calling number, determines that a trigger has already occurred on this subscriber, and the SCP responds with a message to the terminating switch to complete the call (e.g., Authorize_Termination) to the original dialed number (i.e., the subscriber) 625. The original calling number is preserved, for example, in a parameter in the terminating switch. The parameter is sent in a message to the IP (e.g., using IP Route command). The terminating switch routes the call to the subscriber, and the subscriber answers the call. When the subscriber answers the call, the SCP instructs the IP to play an announcement to the subscriber comprising the caller's recorded name (e.g., "You have a call from<recorded name>. To accept it, press or say one. To reject it, press or say two.") 629. Alternatively, the system can query the line information database (e.g., LIDB database) to obtain the caller's name, and phonetically pronounce the caller's name to the subscriber. An input response from the subscriber is received at the IP 631.

If the subscriber rejects the call, the SCP instructs the IP to play a message to the subscriber (e.g., "The caller will be advised that you could not be reached. Good-bye.") 637. The SCP also instructs the IP to play an announcement to the caller 633 (e.g., "The party you were calling could not be reached. Please call again later." Optionally, the SCP instructs the IP to play an announcement that the call is being transferred to voice mail (e.g., Please hold to leave a message); the call is connected to the subscriber's voice message service 635 and the process ends 639. If there is no answer from the subscriber, or the line is busy, the SCP instructs the IP to play a similar message to the caller.

If the subscriber accepts the call, the IP reports the acceptance digit entry to the SCP 641. The SCP instructs the IP to connect the two calls 643. The IP uses its switching module to connect the two calls 645. Optionally, the SCP instructs the IP to play an announcement to the subscriber (e.g., "Go ahead please."), and the process ends 647. Thus, the talking path is routed from the caller, to the caller's end office, to the subscriber's terminating switch, to the IP host switch, to the IP, back to the IP host switch, to the subscriber's terminating switch, and finally to the subscriber. This scenario describes one embodiment of the present invention wherein the subscriber is a residential line subscriber. Other similar or equivalent implementations, for example in a wireless network, are also possible.

The above description is included to illustrate the operation to the preferred embodiments and is not meant to limit the scope of the invention. The scope of the invention is limited only by the following claims. From the above discussion, many variations will be apparent to one skilled in the art that are yet encompassed by the spirit and scope of the invention.

What is claimed is:

1. In a communications network comprising a service control point and an intelligent peripheral wherein a caller initiates a call to a subscriber, a method for providing an audible caller name to the subscriber, the method comprising:

automatically obtaining a caller name associated with a telephone number of the caller via a query made by the service control point to a line information database in a local network;

announcing the caller name to the subscriber via an announcement made by the intelligent peripheral;

instructing the service control point to save the caller name and associated number on a list stored in the local network;

accessing the list by using the caller name; and connecting a call between the subscriber telephone set and a telephone set having number associated with the caller name on the list.

2. The method of claim 1 wherein announcing the caller name to the subscriber comprises playing a phonetically produced rendition of the caller name.

3. The method of claim 1 further comprising;
selectively activating and deactivating providing an announcement of the caller name.

4. The method of claim 1 further comprising:
requesting the subscriber to accept or reject the call via an announcement made by the intelligent peripheral.

5. The method of claim 1 wherein announcing the caller name to the subscriber replaces a conventional telephone ring otherwise heard by the subscriber.

* * * * *

UNITED STATES PATENT AND TRADEMARK OFFICE
CERTIFICATE OF CORRECTION

PATENT NO. : 5,850,435
DATED : 12/15/98
INVENTOR(S) : Douglas Andre Devillier

It is certified that error appears in the above-identified patent and that said Letters Patent is hereby corrected as shown below:

In claim 1, column 6, line 63: after "having" insert --the--.

Signed and Sealed this

Twentieth Day of July, 1999

Attest:

Q. TODD DICKINSON

*Attesting Officer*         *Acting Commissioner of Patents and Trademarks*